US011885152B2

(12) United States Patent
Clifford

(10) Patent No.: US 11,885,152 B2
(45) Date of Patent: Jan. 30, 2024

(54) SYSTEM AND METHOD FOR TRANSFERRING ROTATION OF LOCK INDICATOR THROUGH CYLINDRICAL LOCK

(71) Applicant: dormakaba USA Inc., Indianapolis, IN (US)

(72) Inventor: Jason C. Clifford, Noblesville, IN (US)

(73) Assignee: dormakaba USA Inc., Indianapolis, IN (US)

( * ) Notice: Subject to any disclaimer, the term of this patent is extended or adjusted under 35 U.S.C. 154(b) by 154 days.

(21) Appl. No.: 17/355,045

(22) Filed: Jun. 22, 2021

(65) Prior Publication Data

US 2022/0003020 A1 Jan. 6, 2022

Related U.S. Application Data

(60) Provisional application No. 63/047,044, filed on Jul. 1, 2020.

(51) Int. Cl.
*E05B 39/00* (2006.01)
*E05B 55/00* (2006.01)

(52) U.S. Cl.
CPC ............ *E05B 39/00* (2013.01); *E05B 55/005* (2013.01)

(58) Field of Classification Search
CPC ........ E05B 39/00; E05B 35/00; E05B 35/001; E05B 41/00; E05B 17/00; E05B 17/10; E05B 55/00; E05B 55/005
USPC ....................................................... 292/336.3
See application file for complete search history.

(56) References Cited

U.S. PATENT DOCUMENTS

D353,532 S 12/1994 Miller
D628,587 S 12/2010 Vandeberghe et al.
D683,755 S 6/2013 Phelan
D685,249 S 7/2013 Friedli
D718,113 S 11/2014 Di Nicola Ciaranca
D738,913 S 9/2015 Cabrera-Cordon et al.
9,169,669 B2 10/2015 Clary et al.
(Continued)

FOREIGN PATENT DOCUMENTS

CN 304918272 S 11/2018
CN 305354798 S 9/2019
(Continued)

OTHER PUBLICATIONS

Anikia, Depositphoto, Date first available Sep. 6, 2019 [online]retrieved Jul. 14, 2021, available from, https://depositphotos.com/303391448/stock-illustration-sign-open-close-and-a.html (Year: 2019).
(Continued)

*Primary Examiner* — Nathan Cumar
(74) *Attorney, Agent, or Firm* — Faegre Drinker Biddle & Reath LLP

(57) ABSTRACT

Lock indicators useable to signal the locked or unlocked state of a lock at both sides of a door selectively secured by the lock. Lock indicators include a first cuff for receiving an input causing the first cuff to transition from a first position to a second position associated with the locked state and the unlocked state. The lock indicators include a second cuff for receiving input from the first cuff via a transmission rod causing the second cuff to transition from a first position to a second position associated with the locked state and the unlocked state.

20 Claims, 7 Drawing Sheets

(56) References Cited

U.S. PATENT DOCUMENTS

| | | | |
|---|---|---|---|
| 9,273,495 B2 | 3/2016 | Tien | |
| 9,435,141 B2 | 9/2016 | Tien | |
| 9,569,066 B2 | 2/2017 | Van et al. | |
| D794,676 S | 8/2017 | Daniel | |
| D803,872 S | 11/2017 | Cole | |
| 9,945,158 B2 | 4/2018 | Lehner et al. | |
| D819,690 S | 6/2018 | Choi et al. | |
| D826,983 S | 8/2018 | Hamaguchi et al. | |
| D826,984 S | 8/2018 | Gatts et al. | |
| D840,434 S | 2/2019 | Haverstock et al. | |
| D851,126 S | 6/2019 | Tauban | |
| D851,127 S | 6/2019 | Tauban | |
| D888,762 S | 6/2020 | Butcher et al. | |
| D894,229 S | 8/2020 | Hoofard et al. | |
| D904,424 S | 12/2020 | Hansen et al. | |
| D909,175 S | 2/2021 | Wu | |
| D912,089 S | 3/2021 | Ocando et al. | |
| D966,866 S | 10/2022 | Woodley et al. | |
| 2004/0187533 A1* | 9/2004 | Huang | E05B 41/00 70/432 |
| 2005/0081164 A1 | 4/2005 | Hama et al. | |
| 2013/0150128 A1 | 6/2013 | Tsunoda | |
| 2014/0245798 A1 | 9/2014 | Beckman | |
| 2015/0252592 A1 | 9/2015 | Tien | |
| 2015/0315816 A1 | 11/2015 | Gopalakrishnan et al. | |
| 2017/0342740 A1* | 11/2017 | Basavaraju | E05B 41/00 |
| 2018/0066450 A1 | 3/2018 | Voelker | |
| 2019/0323264 A1* | 10/2019 | Lunday | E05B 55/005 |
| 2019/0368226 A1 | 12/2019 | Sweeney et al. | |
| 2020/0157856 A1 | 5/2020 | Kim et al. | |
| 2020/0408002 A1 | 12/2020 | Woodley et al. | |

FOREIGN PATENT DOCUMENTS

| | | |
|---|---|---|
| CN | 305806969 S | 5/2020 |
| CN | 305848401 S | 6/2020 |
| CN | 306116534 S | 10/2020 |

OTHER PUBLICATIONS

Beacon,Classroom Door Security, Date first available from wayback date Jun. 4, 2018, [online]retrieved May 11, 2021, available from wayback https://web.archive.Org/web/20180930130925/http://www.beaconcdl.com/classroom-door-security/ (Year: 2018).

Probrico Store, Electronic Keypad Deadbolt, Date first available Jun. 18, 2020, [online]retrieved Jun. 24, 2021, available from https://www.amazon.com/Probrico-Electronic-Deadbolt-Camelot-Cylinder/dp/B08BFL66F3/ref=sr_1_17?dchild=1&keywords=Lockey+Digital+Door+Lock+M220+Surface+Mount+Deadbolt&qid=1614803709& (Year: 2020).

Product brochure for Best 9K Series Intruder Function lock, bestaccess.com, 2017.

Redtron, Child Proof Safety Locks, Date first available Apr. 21, 2019, [online]retrieved Feb. 16, 2021, available from https://www.amazon.ca/Upgraded-Adjustable-Adhesive-Cabinets-Drilling/dp/B07R1RBDM4/ref=pd_day0_11?pd_rd_w=tShLC&pf_rd_p=a0f07c06-3bfe-427e-9527-5be8cea27b66&pf_rd_r=3PYT4GPHETW74Q63WFCD& (Year: 2019).

Wassers, Child Safety Oven Door Lock, Date first available Dec. 3, 2019, [online]retrieved Feb. 16, 2021, available from https://www.amazon.ca/Child-Safety-Oven-Door-Sticker-Universal/dp/B081PML3JK/ref=sr_1_245?dchild=1&keywords=Magnetic+Child+Lock&qid=1613508430&sr=8-245 (Year: 2019).

* cited by examiner

SYSTEM AND METHOD FOR TRANSFERRING ROTATION OF LOCK INDICATOR THROUGH CYLINDRICAL LOCK

RELATED APPLICATION

This application claims the benefit of U.S. Provisional Application Ser. No. 63/047,044, filed Jul. 1, 2020, docket BAS-2020503-01-US, titled SYSTEM AND METHOD FOR TRANSFERRING ROTATION OF LOCK INDICATOR THROUGH CYLINDRICAL LOCK, the entire disclosure of which is expressly incorporated by reference herein.

FIELD

The present disclosure relates to door locks and, in particular, to door locks having a lock status indicator.

BACKGROUND

Door locks can take a number of different forms, including cylindrical locks and mortise locks. In certain instances, a door lock can be locked on an ingress and/or an egress side of the lock. It may be advantageous to signal to occupants that a door lock maintains the locked condition, limiting ingress or egress. Cylindrical locks provide unique challenges to providing a lock indicator status on both sides of a door while maintaining durability of the components for high-use door locks.

SUMMARY

The present disclosure provides, in part, lock indicators useable to signal the locked or unlocked state of a lock at both sides of a door selectively secured by the lock. For example, the present disclosure provides a lock with an indicator viewable by occupants of an area secured by the lock and from an area outside of the door and door lock. Throughout this document, “inside” will be used to reference the side of a door and lock actuator available to occupants of an area secured by the lock, while “outside” will be used to reference the side of a door and lock actuator available to those seeking ingress to the secured area.

In an exemplary embodiment of the present disclosure, a lock indicator mechanism for a lock on a door is provided, the lock indicator mechanism including a locking lug transitionable between a locked position locking the lock and an unlocked position unlocking the lock; a first cuff operable to be positioned on a first side of a door, the first cuff operable to be positioned in a locked display position when the locking lug is in the locked position and operable to be positioned in an unlocked display position when the locking lug is in the unlocked position, the first cuff including a transmission actuator; a first lock indicator operably coupled with the first cuff; a second cuff operable to be positioned on a second side of the door, the second cuff including a transmission receiver; a second lock indicator operably coupled with the second cuff; and a transmission rod extending between the first cuff and the second cuff and operable to transmit motion from the first cuff to the second cuff via the transmission actuator of the first cuff and the transmission receiver of the second cuff.

In an example thereof, the lock indicator mechanism further comprises a hub including a first channel and a second channel, wherein the locking lug includes an engagement portion operable to be positioned in the first channel of the hub when the locking lug is in the locked position and operable to be positioned in the second channel of the hub when the locking lug is in the unlocked position.

In a further example thereof, the first cuff includes a rotation actuator at least partially positioned in the first channel of the hub when the locking lug is in the unlocked position and is operable to be transitioned away from the first channel when the locking lug is transitioned into the locked position.

In a further example thereof, the first cuff is restrained from axially linear movement and the rotation actuator of the first cuff comprises an angled wall, the angled wall operable to receive axially linear motion of the engagement portion of the locking lug as the engagement portion is transitioned into the first channel of the hub and translate the axially linear motion of the engagement portion of the locking lug into rotational motion of the first cuff.

In a further example thereof, the lock indicator mechanism further comprises a resilient restraint operably engaged with the first cuff, such that the resilient restraint exerts a force operable to rotate the first cuff such that the rotation actuator is positioned in the first channel of the hub when the engagement portion of the locking lug is positioned in the second channel.

In an example thereof, the transmission actuator of the first cuff and the transmission receiver of the second cuff each includes a curved rack and the transmission rod includes a pinion operably engaged with each of the curved racks.

In an exemplary embodiment of the present disclosure, a cylindrical lock is provided, the cylindrical lock including a latch moveable between an engaged position operable to limit ingress and egress and a disengaged position not operable to limit ingress and egress; an egress actuator operable to receive a first operator input motion to actuate the egress actuator to move the latch from the engaged position to the disengaged position; an ingress actuator operable to receive a second operator input motion to actuate the ingress actuator to move the latch from the engaged position to the disengaged position; a lock input actuatable between a locked position and an unlocked position, the locked position of the lock input positioning the lock in a locked condition blocking the first and second operator input motion from actuating one of the egress actuator and the ingress actuator to move the latch from the engaged position to the disengaged position; a first indicator having a lock signal signaling the locked position of the lock input and an unlock signal signaling the unlocked position of the lock input, the first indicator selectively displaying only one of the lock signal and the unlock signal, the first indicator having a lock signal display position in which the lock signal is displayed and an unlock signal display position in which the unlock signal is displayed; a second indicator having a lock signal signaling the locked position of the lock input and an unlock signal signaling the unlocked position of the lock input, the second indicator selectively displaying only one of the lock signal and the unlock signal, the second indicator having a lock signal display position in which the lock signal is displayed and an unlock signal display position in which the unlock signal is displayed; and a transmission rod operably coupling the first and second indicators such that when the first indicator displays the lock signal the second indicator displays the lock signal and such that when the first indicator displays the unlock signal the second indicator displays the unlock signal.

In an example thereof, the cylindrical lock further comprises a first hub associated with the ingress actuator, and a second hub associated with the egress actuator, and a first locking lug positioned relative to the first hub, the first locking lug is operable to transition between an engaged position and a disengaged position relative to the first hub.

In a further example thereof, the first hub includes a lock channel wherein, when the first locking lug is in the engaged position the first locking lug is at least partially positioned in the lock channel.

In a further example thereof, the first hub includes an unlock channel, wherein when the first locking lug is in the disengaged position the first locking lug is at least partially positioned in the unlock channel such that the first locking lug is operable to rotate within the unlock channel of the first hub.

In a further example thereof, the cylindrical lock further comprises a first cuff positioned with the first hub, the first cuff operable to transition between a locked status position and an unlocked status position.

In a further example thereof, the first cuff includes a lock input operable to transition the first cuff from between a first position and a second position responsive to mechanical input received from the first locking lug.

In a further example thereof, the lock input comprises an angled surface operable to result in rotational movement of the first cuff when contacted by the first locking lug.

In a further example thereof, the first cuff includes a mechanical transmitter operably coupled to the second indicator and operable to mechanically transmit movement of the first cuff to the second indicator.

In a further example thereof, the cylindrical lock further comprises a transmission rod operably coupled to the mechanical transmitter of the first cuff and operable to mechanically transmit movement of the first cuff to the second indicator.

In a further example thereof, the transmission rod comprises a timing pin aligning the first hub and the second hub.

In a further example thereof, the transmission rod includes splined ends and wherein the mechanical transmitter comprises a rack operably coupled to one of the splined ends such that rotation of the first cuff about a first axis results in rotation of the transmission rod about a second axis.

In a further example thereof, the cylindrical lock further comprises a second cuff positioned with the second hub, the second cuff operable to transition between a locked status position and an unlocked status position in response to mechanical input received from the transmission rod.

In a further example thereof, the second cuff includes a mechanical transmission receiver operably coupled to the transmission rod.

In a further example thereof, the second cuff is operably coupled to the second indicator such that rotation of the second cuff results in rotation of the second indicator.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
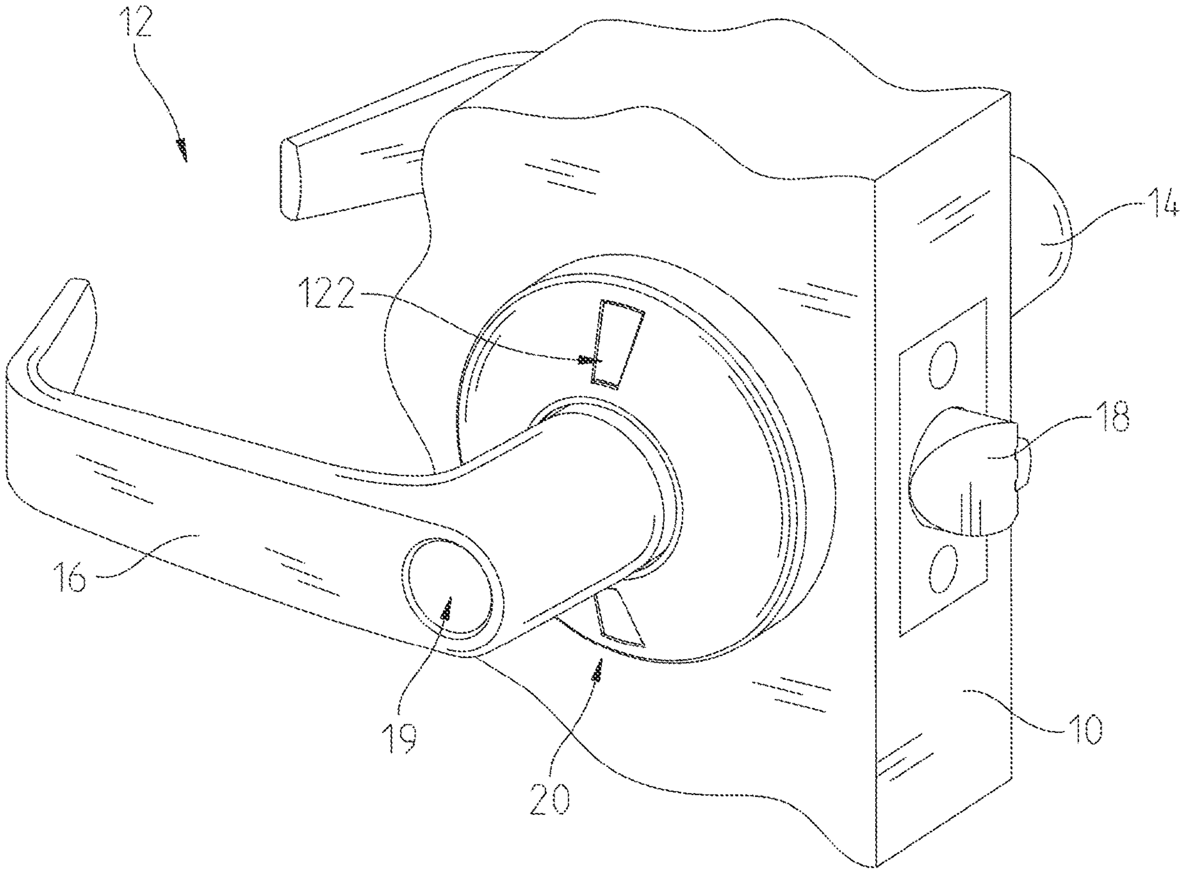
FIG. 1 is a perspective view of a door lock mounted on a door, the door lock including a lock indicator system, according to one embodiment.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof may be used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, may be used in reference to various components or features. Such use is not intended to denote an ordering of the components or features. Rather, numeric terminology is used to assist the reader in identifying the component or features being referenced and should not be narrowly interpreted as providing a specific order of components or features.

FIG. 1 illustrates door 10 having door lock 12. As illustrated, door lock 12 is exemplified as a cylindrical lock. Cylindrical locks are well known in the art; therefore, in the description that follows only certain details of the exemplary locks are described in detail, with the detailed description instead focusing on the indicator apparatus and associated method of use.

As illustrated in FIG. 1, door lock 12 includes an egress actuator exemplified as egress handle 14. Door lock 12 further includes an ingress actuator exemplified as ingress handle 16. Door lock 12 is operably coupled to door 10. Door 10 is, in use, arranged to selectively allow and disallow ingress and egress from an area selectively covered by door 10. In an exemplification, door 10 can be hinged to a doorframe and can be selectively secured thereto by latch bolt 18, as is well known in the art. When door lock 12 is in an unlocked condition, both egress handle 14 and ingress handle 16 can be actuated by an operator input motion to move latch bolt 18 from the extended position illustrated in FIG. 1 to a retracted position allowing ingress and egress through door 10. When one of egress handle 14 and ingress handle 16 is actuated to move latch bolt 18 to the retracted position (e.g., disengaged position where latch bolt 18 is not contacting a portion of a door frame), door 10 can be moved relative to its doorframe to allow ingress and egress therethrough. Translation of rotational movement of egress handle 14 and ingress handle 16 to retraction of latch bolt 18 is well known in the art and is therefore not described in detail for the sake of brevity. For example, rotational movement of the egress handle 14 and/or ingress handle 16 results in rotational movement of a cam that reciprocates latch bolt 18. Door lock 12 also includes lock input 19 operable to receive user input for placing door lock 12 in locked or unlocked condition. For example, lock input 19 may include a push button, a twist lock, or a keyed lock.

Door lock 12 further includes lock indicator assembly 20. Lock indicator assembly 20 displays to a user the lock status of door lock 12 (e.g., a locked status or an unlocked status). Lock indicator assembly 20 includes components placed on both sides of door 10, the components providing visual indication to a user of the lock status of door lock 12. Lock indicator assembly 20 transitions between displaying a locked status and an unlocked status when door lock 12 is in a locked condition or in an unlocked condition, respectively.

Although the following discussion may designate the first and second lock assemblies as having certain components or features relating to an interior or exterior side, in some embodiments those components or features may be exchanged. For example, those components and features associated with the first lock as discussed below may be implemented on the interior or exterior side of a door and those components and features of the second lock as discussed below may be implemented on the other side of the door.

Figure 2:
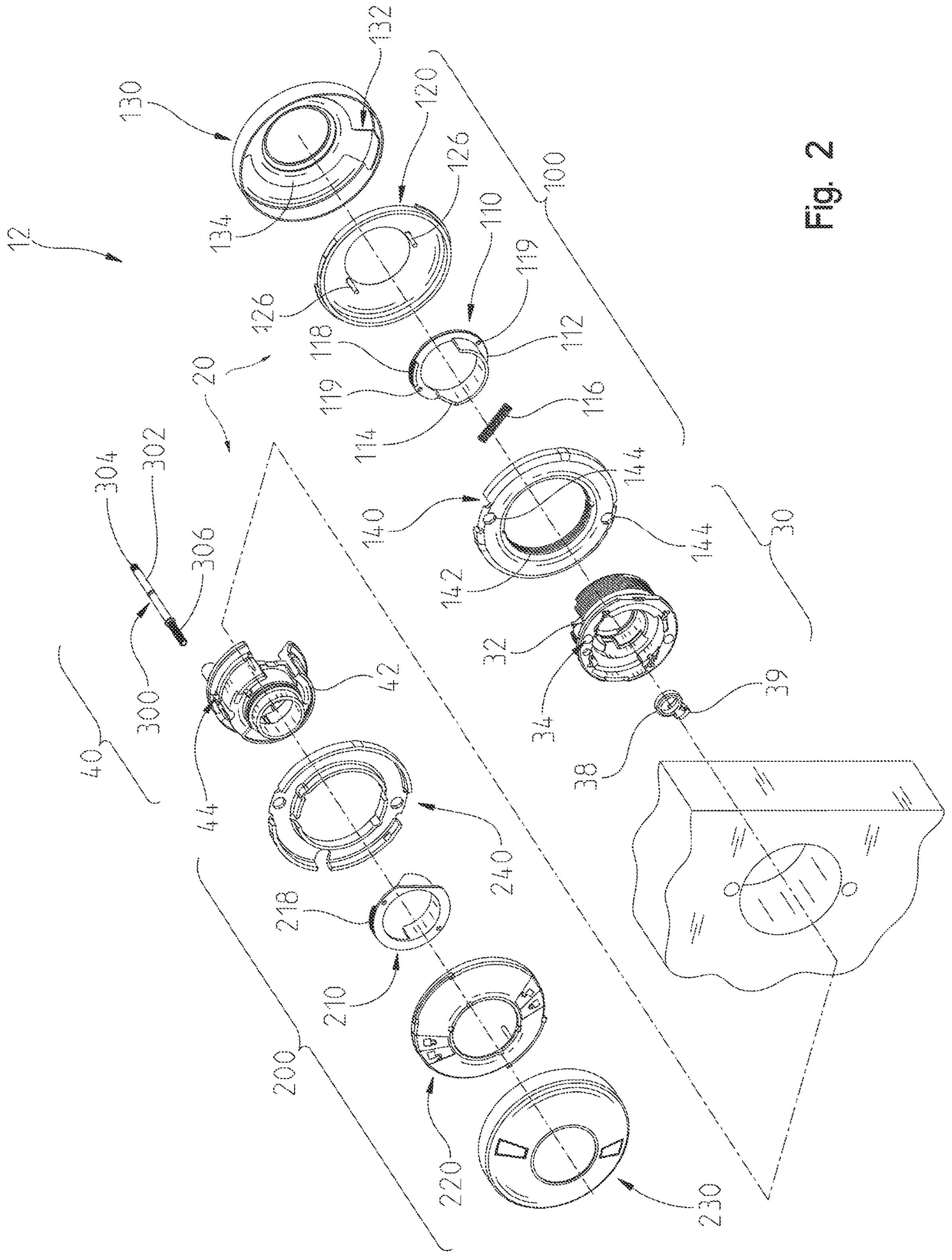
FIG. 2 is an exploded view of a lock assembly and a lock indicator assembly, according to one embodiment.

Referring now to FIG. 2, door lock 12 includes lock indicator assembly 20 (e.g., first and second lock indicators 100, 200, respectively) and lock assemblies 30, 40. Lock indicator assembly 20 is operable to display to a user the lock status of door lock 12 (e.g., a locked status or an unlocked status) on both sides of door 10. Lock indicator assembly 20 transitions between displaying a locked status and an unlocked status. Door lock 12 is transitioned between the locked condition and the unlocked condition via one of the lock assemblies (e.g., lock assembly 30). Lock assembly 30 actuates lock indicator assembly 20 as door lock 12 is transitioned between the locked and the unlocked conditions.

Lock indicator assembly 20 can be implemented on door lock 12 when the door lock 12 is a cylindrical lock, such that lock indicator assembly 20 mechanically transmits the lock status of one side of door lock 12 through the cylindrical lock to the opposite side of door lock 12. Lock indicator assembly 20 includes first lock indicator 100 for positioning on the first side of door 10, second lock indicator 200 for positioning on second side of door 10, and mechanical transmitter 300 for transmitting the lock status through the cylindrical lock between the first and second sides of door 10.

As described in further detail below, first lock indicator 100 includes first cuff 110, first flag 120, first rose 130, and first rose liner 140. First cuff 110 receives a mechanical input from first lock assembly 30. As first cuff 110 is actuated, first cuff 110 transmits the mechanical input to first flag 120. First flag 120 displays a locked or unlocked status to a user based on the mechanical input received from first lock assembly 30. First flag 120 is positioned between first rose 130 and first rose liner 140, where first rose 130 and first rose liner 140 are coupled to first lock assembly 30 and/or door 10 (as shown in FIG. 1).

Figure 5A:
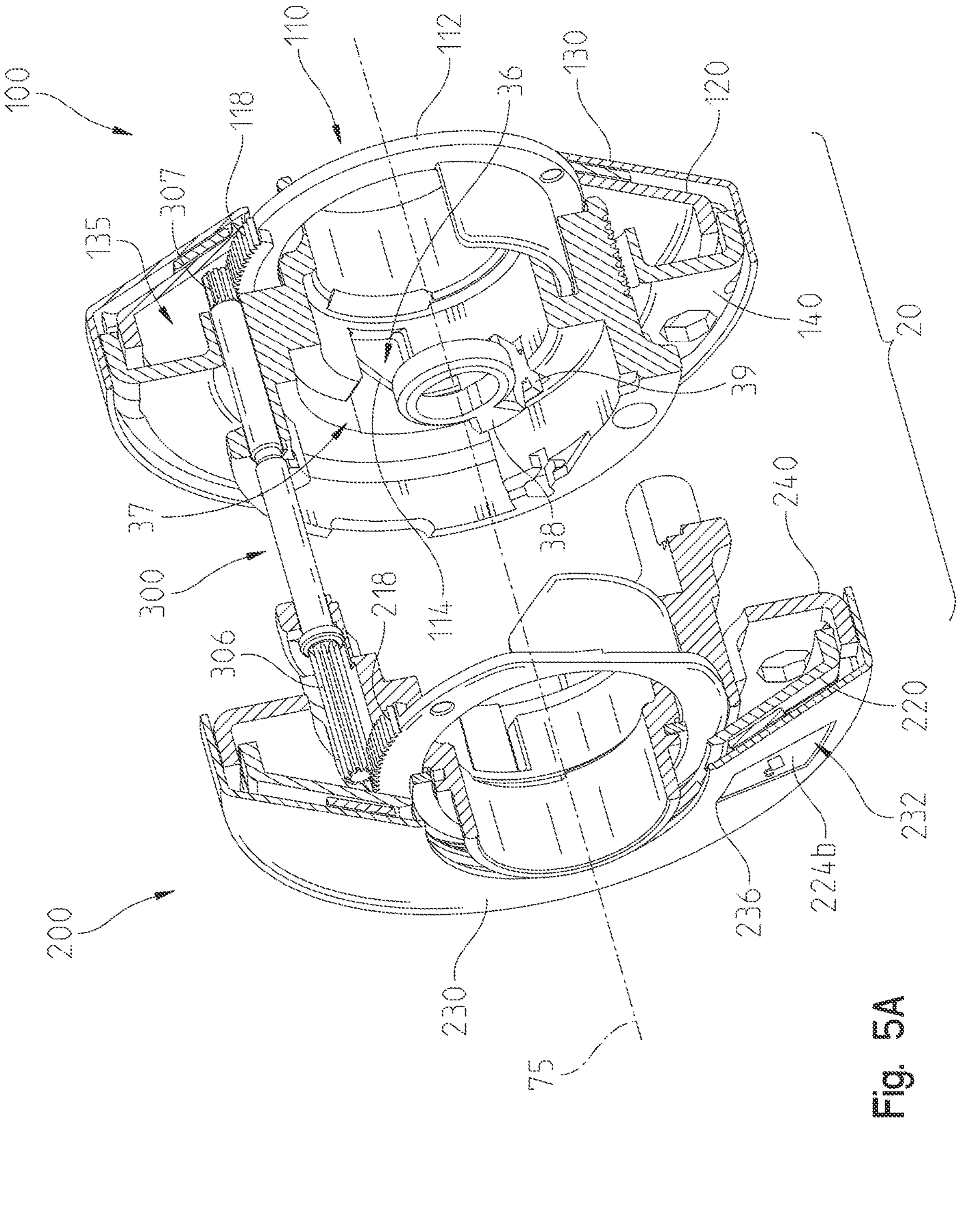
FIG. 5A is a partial longitudinal sectional view, where hubs, roses, rose liners, and flags are sectioned and cuffs, a locking lug, and a transmission rod are shown in a perspective view, where the locking lug is positioned in an unlock channel of one of the hubs, according to one embodiment.
Figure 5B:
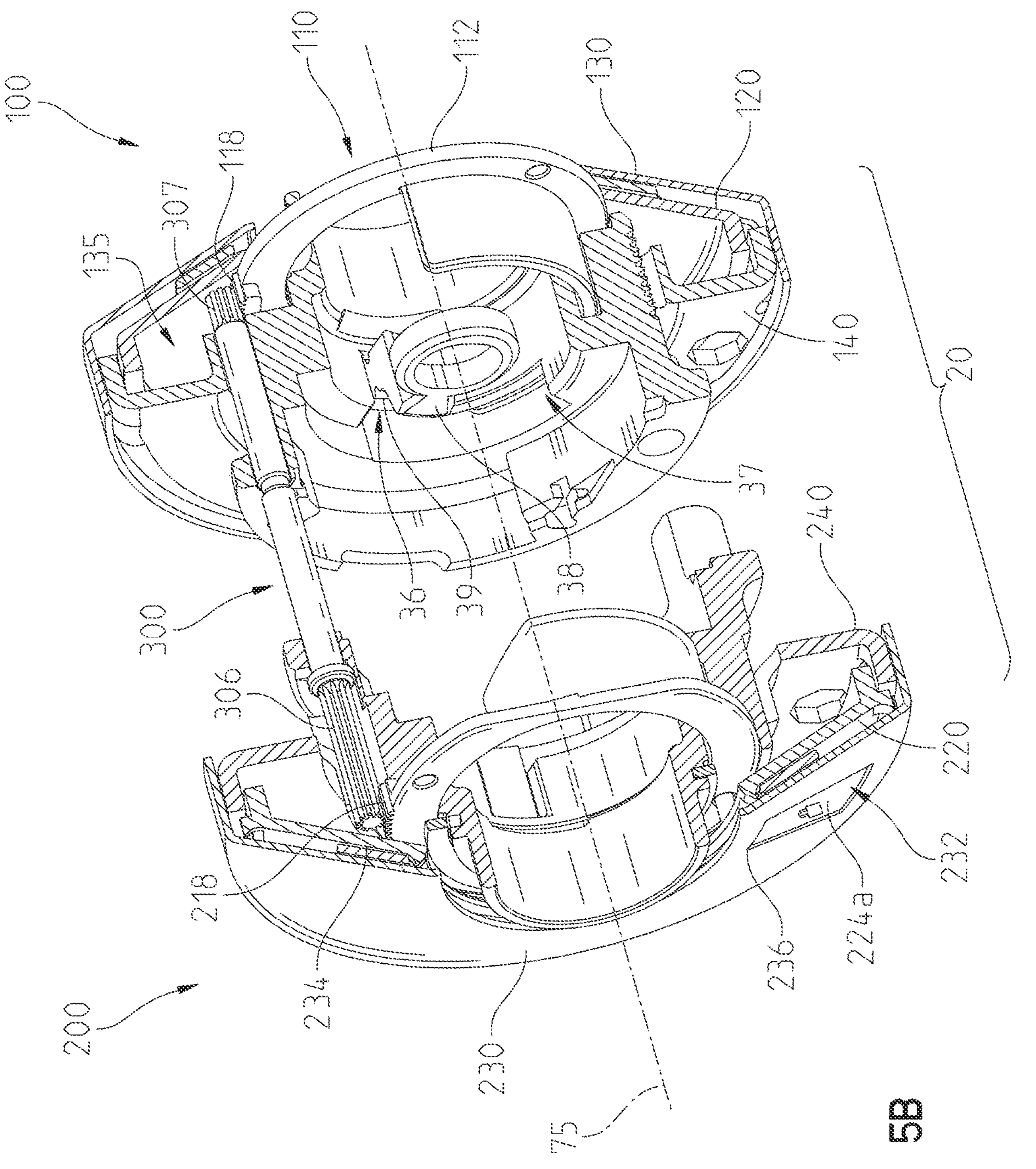
FIG. 5B is a partial longitudinal sectional view according to FIG. 5A, where the locking lug is positioned in a lock channel of the hub, displacing the respective cuff, according to one embodiment.

Referring still to FIG. 2 (see also FIG. 3), first cuff 110 includes cap 112 which is positioned coaxially relative to first lock assembly 30 (e.g., cap 112 and cuff 30 share a longitudinal axis). In some embodiments, cap 112 is ring shaped, but may also be formed in an arcuate shape extending less than 360 degrees. Referring to FIGS. 5A and 5B (see also FIGS. 2 and 3), first cuff 110 includes lock input portion 114 (e.g., a rotation actuator) operably coupled to first lock assembly 30 such that as first lock assembly 30 transitions between a locked condition and an unlocked condition, lock input portion 114 receives mechanical input from first lock assembly 30 that transitions first cuff 110 between a first and a second position associated with the locked and unlocked conditions of first lock assembly 30. Although various lock input portions are contemplated, in one embodiment, lock input portion 114 includes a ramped or angled surface that translates linear motion of components of first lock assembly 30 into rotational motion of first cuff 110. For example, first lock assembly 30 includes hub 32 and locking lug 38. Hub 32 and locking lug 38 cooperate to place first lock assembly 30 in either a locked condition or an unlocked condition. The locked condition is achieved when engagement portion 39 of locking lug 38 is positioned within lock channel 36. In this position, lock channel 36 restricts axial rotation of locking lug 38 (e.g., engagement portion 39 is shown positioned in lock channel 36 in FIG. 5B). The unlocked condition is achieved when engagement portion 39 of locking lug 38 is positioned within unlock channel 37. In this position unlock channel 37 permits a predetermined axial rotation of locking lug 38 within unlock channel 37 of hub 32 (e.g., engagement portion 39 shown positioned in unlock channel 37 in FIG. 5A). As engagement portion 39 of locking lug 38 is transitioned from unlock channel 37 to lock channel 36, engagement portion 39 contacts ramped or angled surface of lock input portion 114 of first cuff 110 to apply force to lock input portion 114 of first cuff 110 to cause first cuff 110 to rotate about longitudinal axis 75. In other embodiments, lock input portion 114 includes a first extension portion and a second extension portion that include permanent magnets generating two magnetic fields which interact with a magnetic coupler that is coupled to first lock assembly 30 (e.g., as shown in U.S. Patent App. No. 63/033,806 entitled "Lock Status Indicator" filed Jun. 2, 2020, the disclosure of which is expressly incorporated by reference in its entirety). As first lock assembly 30 transitions between the locked condition and the unlocked condition, the magnetic coupler transitions between the first magnetic field and the second magnetic field of the lock input portion 114, resulting in first cuff 110 transitioning between a first position and a second position associated with the locked and unlocked conditions, respectively, of the first lock assembly 30.

Figure 6A:
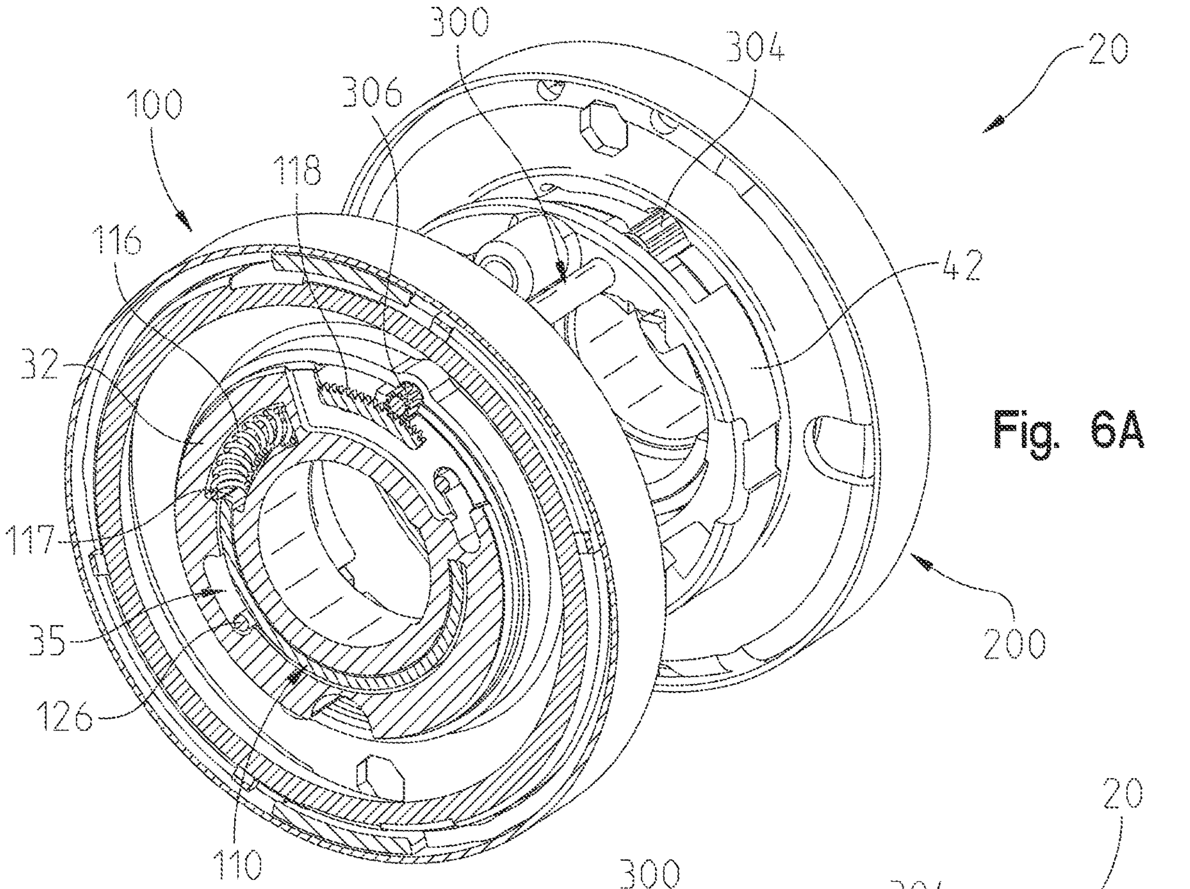
FIG. 6A is a transverse sectional view of a lock assembly and a lock indicator assembly, the lock indicator assembly including a cuff that is in a neutral position and a resilient restraint for maintaining the cuff in the neutral position, according to one embodiment.
Figure 6B:
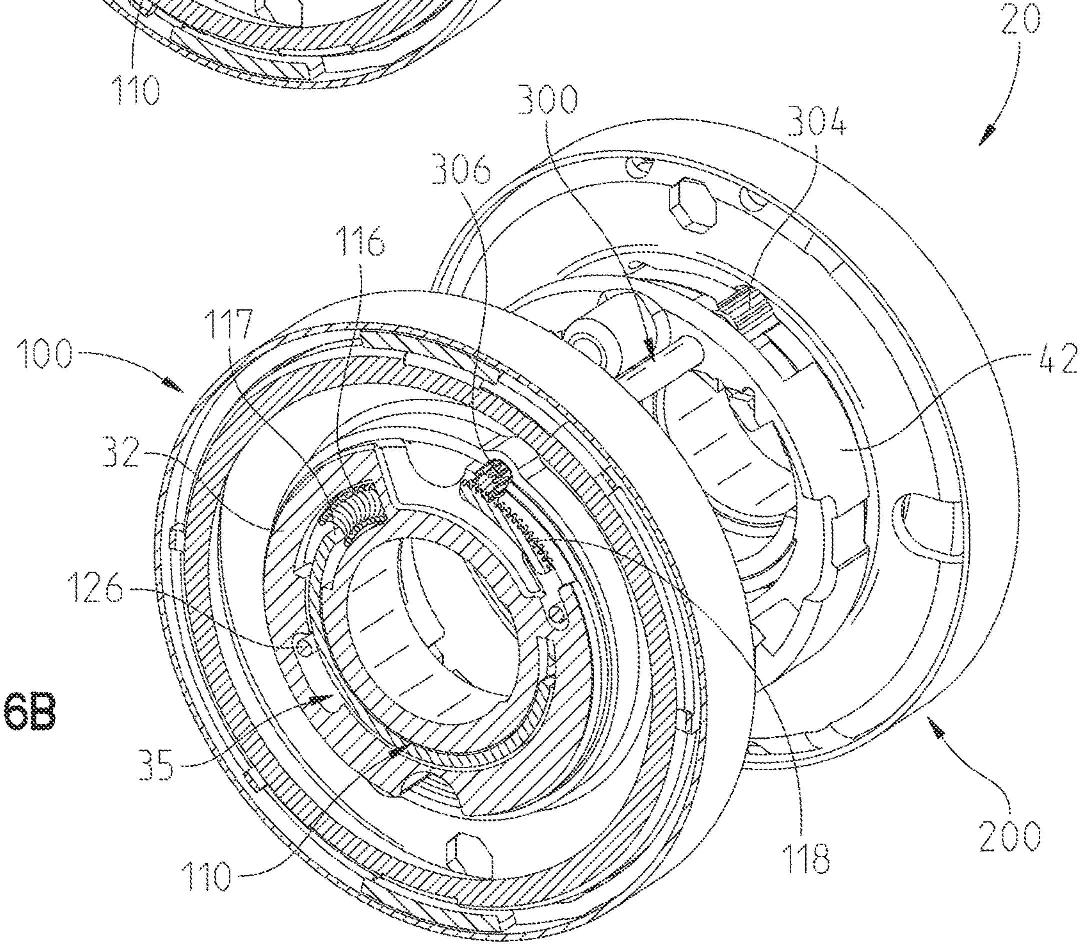
FIG. 6B is a transverse sectional view according to FIG. 6A, where the cuff has been rotated causing compression of the resilient restraint, according to one embodiment.

Referring now to FIGS. 6A and 6B, first cuff 110 includes resilient restraint 116 positioned against stop 117 and operable to bias first cuff 110 toward a neutral position when mechanical input is not being received from first lock assembly 30. For example, resilient restraint 116 is positioned relative to first cuff 110 and hub 32 (e.g., extending between and contacting a portion of first cuff 110 and a portion of hub 32). Resilient restraint 116 applies force against stop 117 of first cuff 110 in order to position first cuff 110 in the first, neutral position. For example, in a previously discussed embodiment, when the lock input portion 114 includes a ramped surface and the ramped surface is not being contacted by first lock assembly 30 with sufficient force to overcome the resistance provided by resilient restraint 116, resilient restraint 116 maintains sufficient contact and/or force against stop 117 of first cuff 110 to position and maintain first cuff 110 in the neutral position. When first lock assembly 30 is transitioned from the unlocked condition to the locked condition, sufficient force is applied to the ramped surface to selectively override resilient restraint 116, allowing first cuff 110 to transition from a first position to a second position. Resilient restraint 116 is at least partially compressed when first cuff 110 is positioned in the second position (as shown in FIG. 6B). When first lock assembly 30 is transitioned back to the unlocked condition, resilient restraint 116 applies sufficient force to first cuff 110 to transition (e.g., rotate) first cuff 110 back to the first, neutral position.

Referring again to FIG. 2 (see also FIGS. 3, 5A, and 5B), first cuff 110 further includes a mechanical transmitter portion 118 operably coupled to second lock indicator 200 via mechanical transmitter 300. Mechanical transmitter portion 118 transmits movement of first cuff 110 to second lock indicator 200 such that the lock condition of first lock assembly 30 is displayed on the opposite side of door 10. In some embodiments, mechanical transmitter portion 118 is a rack, such that linear or rotational movement of mechanical transmitter portion 118 with first cuff 110 can cause rotational movement of a pinion. In some embodiments, the rack is curved.

First cuff 110 is positioned with hub 32 and second cuff 210 is positioned with second hub 42 such that first and second cuffs 110, 210 are coaxial with (e.g., share a longitudinal axis) and longitudinally constrained with first and second hubs 32, 42, respectively (e.g., cuffs 110, 210 held against axial movement along longitudinal axis of hubs 32, 42). First and second cuffs 110, 210 operate relative to first and second hubs 32, 42, such that first and second cuffs 110, 210 are operable to rotate relative to first and second hubs 32, 42 when cuffs 110, 210 are placed in hubs 32, 42.

Figure 3:
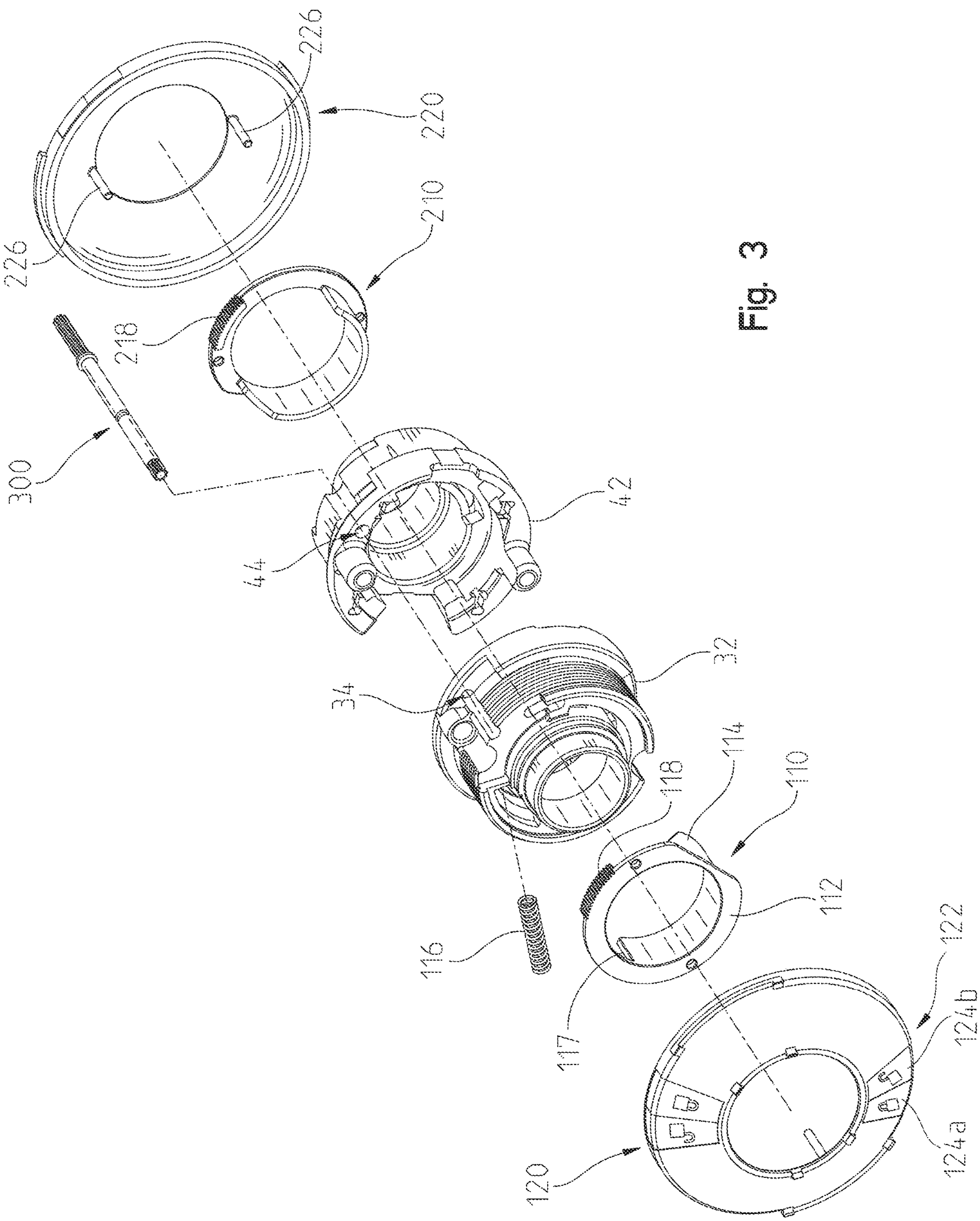
FIG. 3 is an exploded view of components of the lock assembly and the lock indicator assembly of FIG. 2.

Turning now to a discussion of first flag 120, first flag 120 displays to a user the lock condition of first lock assembly 30. First flag 120 includes indicator portion 122 (FIG. 3), which provides visual indication to a user of the lock condition of first lock assembly 30. Indicator portion 122 includes lock indicator 124*a* and unlock indicator 124*b* (FIG. 3). Lock indicator 124*a* and unlock indicator 124*b* may include various visual indications signaling to an observer the lock condition of door lock 12 (e.g., red and green signaling lock and unlock conditions, padlock symbol in locked and unlocked positions, and the words "locked" and "unlocked"). Lock indicator 124*a* and unlock indicator 124*b* are positioned spaced from each other at an angular distance relative to longitudinal axis, the angular distance being equal to the angular distance first cuff 110 and first flag 120 travel in response to actuation by first lock assembly 30. First flag 120 may include two of each of lock indicator 124*a* and unlock indicator 124*b*, where two lock indicators 124*a* are spaced 180 degrees from each other and the two unlock indicators 124*b* are spaced 180 degrees from each other such that when flag 22 is installed, the like symbols can be seen from two positions (e.g., top and bottom, left and right side of door lock 12). Any number of lock and unlock indicators 124*a*, 124*b* can be positioned about first flag 120 for displaying a lock status to a user.

First flag 120, in use, is positioned at least partially between first rose 130 and first rose liner 140. For example, first rose 130 and first rose liner 140 are positioned coaxially and are coupled (e.g., press fit) to form rose space 135 (see FIGS. 5A and 5B) within which portions of first flag 120 are positioned. First flag 120 moves (e.g., rotates) within rose space 135. First rose 130 includes window apertures 132 through which lock and unlock indicators 124*a*, 124*b* of first flag 120 are visible, where lock and unlock indicators 124*a*, 124*b* correspond to window apertures 132. Lens 134 is secured to first rose 130, with windows protruding through window apertures of first rose 130 (see FIG. 2). An adhesive may be employed to effect such securement.

With further reference to FIGS. 2 and 3, first flag 120 further includes cuff coupling portion 126. As previously discussed, first flag 120 transitions from a first position to a second position based on the movement of first cuff 110. Cuff coupling portion 126 of first flag 120 couples with flag coupling portion 119 of first cuff 110. For example, first cuff coupling portion 126 includes posts that extend from first flag 120 and engage with flag coupling portion 119 (e.g., apertures) to transmit rotational movement of first cuff 110 into rotational movement of first flag 120. As is shown in FIGS. 6A and 6B, as first cuff 110 rotates, cuff coupling portion 126 of first flag 120 rotates with first cuff 110 (first cuff 110 and first flag 120 rotate together as a result of cuff coupling portion 126 of first flag being axially restrained with first cuff 110 as shown in and discussed with reference to FIG. 2). Hub 32 includes channels 35 into which cuff coupling portion 126 extends. Channels 35 may also provide stops at which first flag 110 is constrained from rotation, allowing lock indicator 124*a* and unlock indicator 124*b* of first flag 110 to be appropriately positioned for viewing.

In some embodiments, first rose 130 and first rose liner 140 are fitted to doors of varying thicknesses. For example, first rose liner 140 includes rose liner threaded portion 142 that engages with first lock assembly 30. As first rose liner 140 is threaded onto first lock assembly 30 (e.g., hub 32), first rose liner 140 can be adjusted to be positioned proximate or abutting door 10, allowing first rose liner 140 to be adjusted to varying thicknesses of various doors. First rose liner 140 also includes coupling portion 144 operable to limit rotation of first rose liner 140 relative to door 10 when engaged. In some embodiments, coupling portion 144 of first rose liner 140 can only be engaged at predefined positions (e.g., vertical or horizontal positions).

First flag 120 maintains a fixed distance from first rose 130 such that first flag 120 is visible through lens 134 and window aperture 132, for example as discussed in U.S. Patent App. No. 63/033,034 entitled "Cylindrical Lock Status Indicator" filed Jun. 1, 2020, the disclosure of which is expressly incorporated by reference in its entirety.

In some embodiments, first rose 130 is shaped to include a frustoconical shape. First flag 120 includes a similar shape. The frustoconical shape improves visibility of first flag 120 through first rose 130 by angling lock and unlock indicators 124*a*, 124*b*. As many door locks are not positioned at eye level, this allows people to view flag from above or below more conveniently when lock and unlock indicators 124*a*,

124*b* are positioned on first rose 130 vertically above and below first lock assembly 30. Similarly, lock and unlock indicators 124*a*, 124*b*, can be placed at horizontal positions relative to first cuff 110 to provide a wider viewing angle.

Referring again to FIG. 2, lock indicator assembly 20 includes second lock indicator 200. Second lock indicator 200 includes similar components as first lock indicator 100, including second cuff 210, second flag 220, second rose 230, and second rose liner 240. As many features of second lock indicator 200, and specifically the various components of second lock indicator 200 are similar to the components already discussed with respect to first lock indicator 100, for the sake of brevity the discussion of such features is not repeated herein (e.g., cap 212, resilient restraint 216, flag coupling portion 219, lock and unlock indicators 224*a*, 224*b*, cuff coupling portion 226, window apertures 232, windows 236, rose liner threaded portion 242, and coupling portion 244). In contrast to first lock indicator 100, second lock indicator 200 displays the lock condition of a non-corresponding lock assembly, meaning the lock positioned across door 10 (e.g., second lock indicator 200 displays lock condition of first lock assembly 30). In some embodiments, the features discussed with respect to first lock indicator 100 for actuating first lock indicator 100 via first lock assembly 30 (e.g., lock input portion 114) are not included on second cuff 220. Because there is no lock input portion 114 on second cuff, second lock assembly 40 does not control the position of second lock indicator 200 (e.g., second lock indicator 200 does not display the lock condition of second lock assembly 40), which allows second lock indicator 200 to display the lock condition of first lock assembly 30. In some embodiments, second lock assembly 40 is operable to prevent user actuation of corresponding handle 14, 16 from actuating latch bolt 18. In other embodiments, second lock assembly 40 may be a dummy lock, such that actuation of corresponding handle 14, 16 always results in actuation of latch bolt 18 (e.g., in classrooms or commercial spaces where limiting egress is undesirable or a code violation). However, it may be desirable to display the lock condition of one of lock assemblies 30 or 40 on both sides of door 10 (e.g., across door 10, in one example in a classroom during a lock down situation in which occupants of the classroom should know the lock status of an exterior lock operable to limit ingress into the classroom).

Accordingly, second lock indicator 200 includes second cuff 210 having mechanical transmission receiver portion 218. Mechanical transmission receiver portion 218 receives input from first lock indicator 100, the input relaying the lock condition of first lock assembly 30. In some embodiments, mechanical transmission receiver portion 218 includes a rack. For example, the rack receives input from pinion 302 transmitted from first lock indicator 100 such that rotational movement of the pinion results in rotational movement of mechanical transmission receiver portion 218 and second cuff 210. In some embodiments, the rack is curved. As first cuff 110 transitions between a first and second position, that movement is transferred to second cuff 210 from mechanical transmitter portion 118 of first cuff 110 to mechanical transmission receiver portion 218 of second cuff 210 via mechanical transmitter 300.

Figure 4:
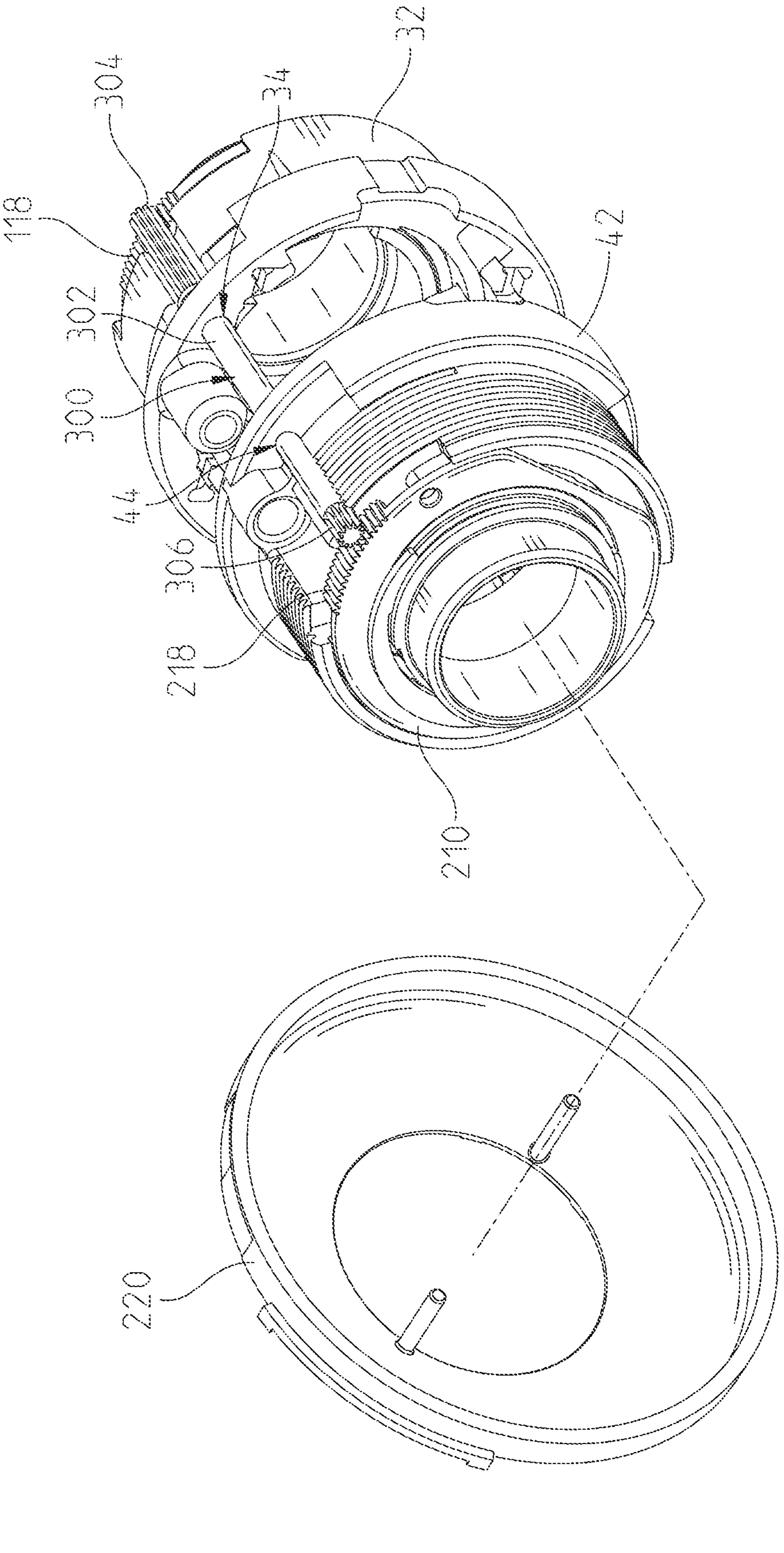
FIG. 4 is a perspective view of interior and exterior hubs with interior and exterior cuffs positioned coaxially therewith, a transmission rod, and a flag removed from one of the hubs and one of the cuffs, according to one embodiment.

Referring to FIG. 4 and turning to a discussion of mechanical transmitter 300, first lock indicator 100 and second lock indicator 200 (shown fully in FIG. 2) are synchronized via mechanical transmitter 300 such that the lock condition of first lock assembly 30 is displayed by both first and second lock indicators 100, 200. Mechanical transmitter 300 extends through at least a portion of door lock 12 such that mechanical transmitter 300 is operably coupled to first lock indicator 100 on a first side of door 10 (e.g., first cuff 110) and second lock indicator 200 on a second side of door 10 (e.g., second cuff 210). As shown in FIGS. 5A and 5B, mechanical transmitter 300 may have a longitudinal axis spaced apart from longitudinal axis 75 such that mechanical transmitter 300 may be positioned radially outward from first cuff 110 and second cuff 210. When door lock 12 is a cylindrical door lock, mechanical transmitter 300 also serves as a timing pin to ensure that components of first lock assembly 30 and second lock assembly 40 are aligned (e.g., first and second hubs 32, 42 of first and second lock assemblies 30, 40 need to be aligned for proper functioning of door lock 12). For example, first hub 32 includes timing pin aperture 34 and second hub 42 includes timing pin aperture 44. Mechanical transmitter 300 extends through timing pin apertures 34, 44 of first and second hubs 32, 42. By consolidating mechanical transmitter 300 and the timing pin of a cylindrical lock, door lock 12 is simplified for manufacturing, for installation, and is more durable with fewer parts for breakdown over prolonged periods of high use. Consolidation of mechanical transmitter 300 and the timing pin of door lock 12 may be necessary in some embodiments, as components of the cylindrical lock are positioned within door 10 such that limited space is available for transmitting input mechanically from one side of door 10 to the other without drilling extra holes through door 10. The disclosed embodiments allow for the lock condition of a door to be mechanically transmitted through door lock 12, where door lock 12 is operable to be fitted into a standard opening in door 10 without further modification to door 10.

Referring still to FIG. 4, in some embodiments, mechanical transmitter 300 includes rod 302 with first and second ends 304, 306. First and second ends 304, 306 are splined to create pinions for use with mechanical transmitter portion 118 of first cuff 110 and mechanical transmission receiver portion 218 of second cuff 210. First and second ends 304, 306 are splined such that the interaction between mechanical transmitter 300, mechanical transmitter portion 118 of first cuff 110, and mechanical transmission receiver portion 218 of second cuff 210 result in a one-to-one movement of first cuff 110 and second cuff 210. In other embodiments, first and second ends 304, 306 of mechanical transmitter 300 are splined to provide various gearing ratios, facilitating use of lock indicators 100, 200 having different proportions. Gearing with various gearing ratios can also be provided to reduce the amount of force needed to actuate both first and second lock indicators 100, 200 via first lock assembly 30. This can also result in decreased wear on the system, thus increasing longevity of the lock indicator assembly 20.

Because first lock indicator 100 and second lock indicator 200 are coupled via mechanical transmitter 300, as first cuff 110 rotates, second cuff 220 rotates. Referring to FIGS. 5A and 5B, as locking lug 38 actuates first cuff 110, first cuff 110 rotates about longitudinal axis 75. Rotation of first cuff 110 includes rotation of mechanical transmitter portion 118. As mechanical transmitter portion 118 rotates, first splined end 304 is actuated to cause mechanical transmitter 300 to rotate. Second splined end 306 actuates mechanical transmission receiver portion 218 of second cuff 210, resulting in rotation of second cuff 210.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A lock indicator mechanism for a lock on a door comprising:

a locking lug transitionable between a locked position locking the lock and an unlocked position unlocking the lock;

a first cuff operable to be positioned on a first side of a door, the first cuff operable to be positioned in a locked display position when the locking lug is in the locked position and operable to be positioned in an unlocked display position when the locking lug is in the unlocked position, the first cuff including a transmission actuator;

a first lock indicator operably coupled with the first cuff;

a second cuff positioned coaxially relative to the first cuff and operable to be positioned on a second side of the door, the second cuff including a transmission receiver;

a second lock indicator operably coupled with the second cuff; and a transmission rod extending between the first cuff and the second cuff and operable to transmit motion from the first cuff to the second cuff via the transmission actuator of the first cuff and the transmission receiver of the second cuff, the transmission rod positioned radially outward from the first cuff and the second cuff.

2. The lock indicator mechanism of claim 1, further comprising a hub including a first channel and a second channel, wherein the locking lug includes an engagement portion operable to be positioned in the first channel of the hub when the locking lug is in the locked position and operable to be positioned in the second channel of the hub when the locking lug is in the unlocked position.

3. The lock indicator mechanism of claim 2, wherein the first cuff includes a rotation actuator at least partially positioned in the first channel of the hub when the locking lug is in the unlocked position and is operable to be transitioned away from the first channel when the locking lug is transitioned into the locked position.

4. The lock indicator mechanism of claim 3, wherein the first cuff is restrained from axially linear movement and the rotation actuator of the first cuff comprises an angled wall, the angled wall operable to receive axially linear motion of the engagement portion of the locking lug as the engagement portion is transitioned into the first channel of the hub and translate the axially linear motion of the engagement portion of the locking lug into rotational motion of the first cuff.

5. The lock indicator mechanism of claim 4, further comprising a resilient restraint operably engaged with the first cuff, such that the resilient restraint exerts a force operable to rotate the first cuff such that the rotation actuator is positioned in the first channel of the hub when the engagement portion of the locking lug is positioned in the second channel.

6. The lock indicator mechanism of claim 1, wherein the transmission actuator of the first cuff and the transmission receiver of the second cuff each includes a curved rack and the transmission rod includes a pinion operably engaged with each of the curved racks.

7. A cylindrical lock comprising:

a latch moveable between an engaged position operable to limit ingress and egress and a disengaged position not operable to limit ingress and egress;

an egress actuator operable to receive a first operator input motion to actuate the egress actuator to move the latch from the engaged position to the disengaged position;

an ingress actuator operable to receive a second operator input motion to actuate the ingress actuator to move the latch from the engaged position to the disengaged position;

a lock input actuatable between a locked position and an unlocked position, the locked position of the lock input positioning the lock in a locked condition blocking the first and second the latch from moving from the engaged position to the disengaged position;

a first indicator having a lock signal signaling the locked position of the lock input and an unlock signal signaling the unlocked position of the lock input, the first indicator selectively displaying only one of the lock signal and the unlock signal, the first indicator having a lock signal display position in which the lock signal is displayed and an unlock signal display position in which the unlock signal is displayed;

a second indicator having a lock signal signaling the locked position of the lock input and an unlock signal signaling the unlocked position of the lock input, the second indicator selectively displaying only one of the lock signal and the unlock signal, the second indicator having a lock signal display position in which the lock signal is displayed and an unlock signal display position in which the unlock signal is displayed, the second indicator and the first indicator positioned about a first longitudinal axis; and a transmission rod operably coupling the first and second indicators such that when the first indicator displays the lock signal the second indicator displays the lock signal and such that when the first indicator displays the unlock signal the second indicator displays the unlock signal, the transmission rod having a second longitudinal axis spaced apart from the first longitudinal axis.

8. The cylindrical lock of claim 7, further comprising a first hub associated with the ingress actuator, and a second hub associated with the egress actuator, and a first locking lug positioned relative to the first hub, the first locking lug is operable to transition between an engaged position and a disengaged position relative to the first hub.

9. The cylindrical lock of claim 8, wherein the first hub includes a lock channel wherein, when the first locking lug is in the engaged position the first locking lug is at least partially positioned in the lock channel.

10. The cylindrical lock of claim 9, wherein the first hub includes an unlock channel, wherein when the first locking lug is in the disengaged position the first locking lug is at least partially positioned in the unlock channel such that the first locking lug is operable to rotate within the unlock channel of the first hub.

11. The cylindrical lock of claim 9, further comprising a first cuff positioned with the first hub, the first cuff operable to transition between a locked status position and an unlocked status position.

12. The cylindrical lock of claim 11, wherein the first cuff includes a lock input operable to transition the first cuff from between a first position and a second position responsive to mechanical input received from the first locking lug.

13. The cylindrical lock of claim 12, wherein the lock input comprises an angled surface operable to result in rotational movement of the first cuff when contacted by the first locking lug.

14. The cylindrical lock of claim 11, wherein the first cuff includes a mechanical transmitter operably coupled to the second indicator and operable to mechanically transmit movement of the first cuff to the second indicator.

15. The cylindrical lock of claim 14, further comprising a transmission rod operably coupled to the mechanical transmitter of the first cuff and operable to mechanically transmit movement of the first cuff to the second indicator.

16. The cylindrical lock of claim 15, wherein the transmission rod includes splined ends and wherein the mechanical transmitter comprises a rack operably coupled to one of the splined ends such that rotation of the first cuff about a first axis results in rotation of the transmission rod about a second axis.

17. The cylindrical lock of claim 16, further comprising a second cuff positioned with the second hub, the second cuff operable to transition between a locked status position and an unlocked status position in response to mechanical input received from the transmission rod.

18. The cylindrical lock of claim 17, wherein the second cuff includes a mechanical transmission receiver operably coupled to the transmission rod.

19. The cylindrical lock of claim 18, wherein the second cuff is operably coupled to the second indicator such that rotation of the second cuff results in rotation of the second indicator.

20. A lock indicator mechanism for a lock on a door comprising:

a locking lug transitionable between a locked position locking the lock and an unlocked position unlocking the lock;

a first cuff operable to be positioned on a first side of a door, the first cuff operable to be positioned in a locked display position when the locking lug is in the locked position and operable to be positioned in an unlocked display position when the locking lug is in the unlocked position, the first cuff including a transmission actuator;

a first lock indicator operably coupled with the first cuff;

a second cuff operable to be positioned on a second side of the door, the second cuff including a transmission receiver;

a second lock indicator operably coupled with the second cuff;

a transmission rod extending between the first cuff and the second cuff and operable to transmit mod on from the first cuff to the second cuff via the transmission actuator of the first cuff and the transmission receiver of the second cuff; and a hub including a first channel and a second channel, wherein the locking lug includes an engagement portion operable to be positioned in the first channel of the hub when the locking lug is in the locked position and operable to be positioned in the second channel of the hub When the locking lug is in the unlocked position.

* * * * *